United States Patent
Ito et al.

(10) Patent No.: US 6,201,066 B1
(45) Date of Patent: *Mar. 13, 2001

(54) ADHESIVE OF POLYOLEFIN AND POLYEPOXIDE FOR EXTRUSION LAMINATION

(75) Inventors: Koichi Ito, Shiojiri; Hiroshi Kasahara, Kawasaki; Satoshi Maruyama, Kawasaki; Masahiro Ueno, Kawasaki; Naoki Minorikawa, Kawasaki, all of (JP)

(73) Assignee: Showa Denko K.K., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,323

(22) Filed: Apr. 17, 1997

Related U.S. Application Data

(63) Continuation of application No. 08/535,889, filed on Sep. 28, 1995, now abandoned.

(30) Foreign Application Priority Data

Jan. 12, 1995 (JP) .................................................... 7-003523
Jan. 19, 1995 (JP) .................................................... 7-006589

(51) Int. Cl.[7] ...................................................... C08F 8/00
(52) U.S. Cl. .......................... 525/120; 427/386; 525/117; 525/118; 525/119
(58) Field of Search .............................. 525/122, 65, 117, 525/118, 119, 120; 427/386

(56) References Cited

U.S. PATENT DOCUMENTS

| | | | |
|---|---|---|---|
| 4,434,261 | * 2/1984 | Brugel et al. | 524/515 |
| 4,472,545 | * 9/1984 | Coughlin et al. | 524/433 |
| 4,522,965 | * 6/1985 | Waniczek et al. | 524/504 |
| 4,548,985 | 10/1985 | Yazaki et al. | 525/65 |
| 4,837,075 | * 6/1989 | Dudley | 156/240 |
| 4,863,784 | * 9/1989 | Lustig et al. | 428/520 |
| 4,882,229 | * 11/1989 | Hwo | 525/240 |
| 4,888,249 | * 12/1989 | Flores et al. | 428/476.1 |
| 4,965,304 | * 10/1990 | Bethea et al. | 524/433 |
| 5,017,429 | * 5/1991 | Akao | 428/349 |
| 5,095,046 | 3/1992 | Tse | 523/206 |
| 5,112,424 | * 5/1992 | Cook | 156/334 |
| 5,387,630 | * 2/1995 | Edwards et al. | 524/232 |

FOREIGN PATENT DOCUMENTS

| | | |
|---|---|---|
| 2025442 | * 3/1991 | (CA) . |
| 121336 | * 10/1984 | (EP) . |
| 0144808 | 6/1985 | (EP) . |
| 2237944 | 2/1975 | (FR) . |
| 57-133055 | 8/1982 | (JP) . |
| 57-157724 | 9/1982 | (JP) . |
| 59-75915 | 4/1984 | (JP) . |
| 63-309438 | * 12/1988 | (JP) . |
| 4-220340 | * 8/1992 | (JP) . |
| 7-40515 | * 2/1995 | (JP) . |

OTHER PUBLICATIONS

Polymers, Laminations & Coatings Conference, 1993, "EAA Extrusion Coating Sealants for Non–Foil Packaging" pp. 421–424.

Derwent accession No. 83–704059/27, Gevorkyan S S, Aug. 1982.*

Derwent accession No. 91–156401/22, Grace W R & Co–Conn, Mar. 1991.*

* cited by examiner

*Primary Examiner*—Robert E.L. Sellers
(74) *Attorney, Agent, or Firm*—Sughrue, Mion, Zinn, Macpeak & Seas, PLLC

(57) ABSTRACT

An adhesive resin composition for extrusion lamination comprising:

(A) At least one component selected from the group consisting of (i) polyolefins having a melt flow rate of 0.1 to 30 g/10 min and (ii) olefinic polymers having at least one functional group capable of reacting with an epoxy group; and (B) an epoxy compound having at least two epoxy groups in the molecule and having a number average molecular weight of 3000 or less, wherein the ratio of the component (B) to the total weight of the components (A) and (B) is 0.01 to 5% by weight, and a laminate of (a) a layer composed of the above-mentioned adhesive resin composition and a substrate contacted therewith.

9 Claims, No Drawings

ADHESIVE OF POLYOLEFIN AND POLYEPOXIDE FOR EXTRUSION LAMINATION

This is a Continuation of Application Ser. No. 08/535,889 filed Sep. 28, 1995, abandoned.

BACKGROUND OF THE INVENTION

1. Field of the Invention

The present invention relates to an adhesive resin composition having high speed moldability, thin moldability, low neck-in property, high draw-down property, excellent heat sensitive adhesion, and excellent calendering and exhibiting strong adhesion properties with a substrate composed of a polyester, polyamide, metal foil (e.g., aluminum foil), etc., in particular, a polyester, and also relates to a laminate having a layer composed of the adhesive resin composition and a process for producing the same. This laminate can be used as packaging such as food packaging.

2. Description of the Related Art

Polyolefins such as polyethylene are excellent in heat sealability and moisture-proofing and is easy to extrude, and therefore, has been used as a single layer film, sheet, or material for shaped containers and also has been widely used in, for example, a packaging field as a laminate with various resin films and sheets, metal foils such as aluminum foil, paper, etc. However, polyolefins are inherently nonpolar and has the defect of poor adhesion to different materials, in particular to polar materials such as polyamide, polyester, aluminum foil. Accordingly, various methods have been proposed to form a multilayer laminate using polyolefins.

In order to produce a laminate of polyethylene and polyamide, for example, the following methods using a modified polyolefin rather than the polyethylene alone have been utilized:

(1) The so-called co-extrusion method of melting a modified polyolefin obtained by graft polymerizing an unsaturated carboxylic acid or its derivative onto polyolefin, an ethylene copolymer obtained by copolymerizing ethylene and an unsaturated carboxylic acid or its derivative, or a composition comprising these polymers and a polyolefin with a polyamide resin and extruding the same from a die to obtain a laminate, (2) The method of preparing a polyamide film in advance and extrusion laminating (or coating) it with a blend of polyethylene and the above polymer, (3) The method of co-extrusion laminating a polyolefin and the above polymer on a polyamide film.

Further, in order to produce a laminate of polyethylene and polyester, there has been proposed the method of using a polymer obtained by grafting glycidyl methacrylate or allylglycidyl ether etc. onto a polyolefin or by copolymerization with ethylene and co-extruding with a polyester or co-extrusion laminating a substrate such as a polyester film.

These methods, however, may give a bond strength in the case of co-extrusion, but cannot give a sufficient bond strength in the case of lamination for laminating on a substrate such as a film, sheet, or paper.

In particular, it is difficult to obtain a laminate having a strong bond strength with, for example, a polyester based substrate.

In order to improve the bond strength, there is the method of raising the temperature at the time of formation, but the polymer is poor in heat stability and decomposes therefore, there is the problem of an odor and fumes at the time of formation. Further, there is the problem of an odor remaining in the laminate product.

As another method for improving the bond strength, there is the method of applying a corona discharge to the substrate. However, in this case, it is necessary to separately prepare a special equipment(s). Also, the bond strength with the substrate is not sufficient.

Furthermore, in order to improve the adhesion, the ozone treatment method of blowing ozone on the resin discharged from the die to cause the surface to oxidize has been used. The ozone treatment has the advantage of enabling oxidation of just the surface requiring the adhesion at a low temperature (Japanese Unexamined Patent Publication (Kokai) No. 57-157724). However, ozone has the problems of odor, corrosiveness, etc. and is still limited in use. Furthermore, the level of the bond strength is still insufficient. In particular, since the laminate absorbs moisture, there is the problem of a large decline in the bond strength.

As a reliable method for obtaining the sufficient adhesion properties with the substrate an adhesive known as an anchor coating agent (or primer) is jointly used.

This method uses an adhesive layer interposed between the substrate and the laminate resin. As the adhesive, an adhesive such as of the imine type such as polyethylene imine or the urethane type is used. In general, a urethane type adhesive is widely used as due to the high bond strength thereof. However, in this method, while a high bond strength is obtained, the coating process is complicated. Further, an organic solvent is used. Therefore, there are also problems in safety or the working environment. Further, it is necessary to prepare the solution of anchor coating agent and wipe off the anchor coating agent adhering to the rolls, so there is the problem of a major reduction in the operation efficiency.

Furthermore, methods of introducing an acid anhydride group, carboxyl group, etc. into the polyolefin are also proposed (see Japanese Unexamined Patent Publication (Kokai) No. 57-133055, Japanese Unexamined Patent Publication (Kokai) No. 59-75915, etc.). However, according to these methods, the adhesion properties with a polyester are insufficient and it is impossible to directly bond to a polyester by extrusion lamination.

SUMMARY OF THE INVENTION

Accordingly, the objects of the present invention are to eliminate the above-mentioned disadvantageous of the conventional art and to provide an adhesive resin composition free from the above defects, having high speed formability, thin formability, low neck-in property, high draw-down property, excellent heat sensitive adhesion, and excellent calendering and provided with strong adhesion properties with a substrate comprising a polyester, polyamide, or aluminum foil, in particular, a polyester, and a laminate having a layer composed of the adhesive resin composition.

Other objects and advantages of the present invention will be apparent from the following description.

In accordance with the present invention, there is provided an adhesive resin composition comprising:

(A) at least one component selected from the group consisting of (i) polyolefins having a melt flow rate of 0.1 to 30 g/10 min and (ii) olefin polymers having at least one functional group capable of reacting with an epoxy group; and (B) an epoxy compound having at least two epoxy groups in the molecule and having a number average molecular weight of 3000 or less, the ratio of the weight of component (B) to the total weight of the components (A) and (B) being 0.01 to 5%.

In accordance with the present invention, there is also provided a laminate comprising at least two layers of (a) a layer composed of an adhesive resin composition according to the present invention and (b) a substrate directly contacted with said layer (a).

In accordance with the present invention, there is further provided a process for producing the laminate according to the present invention, wherein the laminate is produced by extrusion lamination, thermal adhesion or calendering.

DESCRIPTION OF THE PREFERRED EMBODIMENTS

The present invention will be explained in further detail below.

The polyolefin usable as the component (A) (i) used in the present invention is a homopolymer or copolymer of ethylene or an α-olefin of 3 to 16 carbon atoms. Examples of such a polyolefin are a branched low density polyethylene (hereinafter referred to as "LDPE"), a linear low density polyethylene (hereinafter referred to as "LLDPE"), medium and high density polyethylene (hereinafter referred to as "HDPE"), an ethylene and vinyl acetate and/or methacrylate copolymer, propylene polymer, etc. In particular, the use of LDPE is preferred.

These polyolefins may be used alone or in any mixtures thereof.

An LDPE can be generally obtained by effecting the polymerization at a high pressure of, for example, 1000 to 3500 atm. in the presence of a free-radical initiator such as a peroxide. It is characterized by the possession of a large number of long-chain branches, and therefore, it is known that it maintains a superior extrudability. The reactor used for the polymerization may be any of an autoclave or tubular type.

An HDPE and LLDPE generally may be obtained by polymerizing ethylene alone or copolymerizing ethylene and an α-olefin having 3 to 16 carbon atoms using a catalyst known as a Ziegler catalyst, methallocene catalyst, Phillips catalyst, etc. In general, these are produced by the medium and low pressure method, but may also be produced by the high pressure method and may further be produced by any method such as the gas phase method, solution method, slurry method, etc.

The copolymer of ethylene and vinyl acetate and/or methacrylate is generally obtained by effecting the polymerization in the presence of a free radical initiator such as a peroxide in the same way as an LDPE.

As the propylene polymer, a propylene polymer alone or a random or block copolymer of propylene and ethylene or an α-olefin having 4 to 16 carbon atoms may be used.

The melt flow rate of the polyolefin (according to JIS K 6758, showing the value measured at 190° C. for polyethylene resins or at 230° C. for polypropylene resins, hereinafter referred to as the "MFR") is 0.1 to 30 g/10 minutes, preferably 1 to 15 g/10 minutes. When the MFR is less than 0.1 g/10 minutes, the high speed formability and the thin formability become inferior. Contrary to this, when over 30 g/10 minutes, the heat seal strength and the neck-in characteristic are unpreferably decreased.

The olefin polymer having at least one functional group capable of reacting with an epoxy group usable as the component (A) (ii) are those having, for example, a carboxyl group or its derivative, an amino group, a phenol group, hydroxyl group, thiol group, etc. Among these, from the viewpoint of the balance between the reactivity and the stability, it is preferable that there be at least one group selected from the group consisting of acid anhydride groups, carboxyl groups, and carboxylic acid metal salts (i.e., metal carboxylate) present in the molecule. As the method of introducing the functional group capable of reacting with the epoxy groups, into the olefin polymer, the copolymerization method and grafting method may be principally used. As the olefin, ethylene or olefins having a carbon atom of 3 to 16 may be preferably used.

As the olefin polymer having a functional group capable of reacting with an epoxy group produced by the copolymerization method, a multipolymer of ethylene and a compound copolymerizable with ethylene may be mentioned.

As the compound copolymerizable with the ethylene for the copolymerization, an α,β-unsaturated carboxylic acid such as (meth)acrylic acid, an α,β-unsaturated metal carboxylate such as sodium (meth)acrylate, zinc (meth)acrylate, an unsaturated carboxylic acid anhydride such as maleic anhydride, itaconic anhydride, and citraconic anhydride, a hydroxyl-group containing compound such as a hydroxyethylmethacrylate and methallylalcohol, an unsaturated amine compound such as allylamine, etc. may be mentioned, but the invention is not limited to these compounds.

Further, in addition to these unsaturated compounds, it is also possible to copolymerize and use methacrylates, vinyl alcohol esters such as vinyl acetate and vinyl propionate, etc.

These compounds may be used in any mixture thereof in the copolymer with the ethylene. Further, two or more types of the copolymers of these compounds and ethylene may be used together.

The polyolefin with the functional group capable of reacting with an epoxy group introduced by this graft modification generally is produced by contacting the polyolefin, a radical initiator, and a modifiying compound in a molten or solution state.

As the polyolefin for the graft modification, an LDPE, LLDPE, HDPE, polypropylene, propylene-ethylene copolymer, propylene-butene-1 copolymer, ethylene-vinyl acetate copolymer, ethylene-methacrylate copolymer, ethylene-vinyl acetate-methacrylate copolymer, etc. alone or in any mixture thereof may be mentioned. These polymers may be produced in any conventional monomer.

Further, it is also possible to use a further graft-modified copolymer already including an acid or its derivative, such as an ethylene-methacrylate-maleic anhydride copolymer.

The radical initiator usable in the present invention is not particularly limited, but in general an organic peroxide is used. Among these, in view of the reactivity and easy handling, dicumyl peroxide, 2,5-dimethyl-2,5-bis(t-butylperoxide)hexane, 1,3-bis(2-t-butylperoxyisopropyl) benzene, and benzoylperoxide may be particularly mentioned as specific useful examples.

As the unsaturated compound for the modification, an unsaturated compound similar to the compounds copolymerizable with ethylene mentioned above can be used. Basically, any compounds having an acid or its anhydride group, its metal salt group, ester, amine group, hydroxyl group, etc. and radical reactable unsaturated groups can be used.

As the unsaturated compound for the modification, an unsaturated carboxylic acid such as methacrylic acid, an unsaturated metal carboxylate such as sodium methacrylate, an unsaturated carboxylic acid anhydride such as maleic anhydride, itaconic anhydride, and citraconic anhydride, an unsaturated hydroxyl group containing compound such as hydroxyethyl methacrylate and methallyalcohol, an unsaturated amine compound such as allylamine, etc. may be mentioned, but the invention is not limited to these compounds.

The content of the functional groups in the polyolefin resin of the present invention is 0.05 to 20% by weight, preferably 0.1 to 10% by weight, particularly preferably 0.2 to 5% by weight, based on the weight of the modified monomer.

Specific examples of the polyolefin resin of the present invention are an ethylene-maleic anhydride copolymer, ethylene-itaconic anhydride copolymer, ethylene-citraconic anhydride copolymer, ethylene-methacrylate copolymer, ethylene-sodium methacrylate copolymer, ethylene-maleic anhydride-methacrylate copolymer, ethylene-maleic anhydride-vinyl alcohol ester copolymer, maleic anhydride-modified polyethylene, maleic anhydride-modified polypropylene, maleic anhydride-modified polyethylene, maleic anhydride-modified polypropylene, maleic anhydride-modified ethylene-methacrylate copolymer. Among these, the use of an ethylene-maleic anhydride copolymer and ethylene-maleic anhydride-methacrylate copolymer is preferable.

The amount of the component (A) (ii), i.e., the olefin polymer having a functional group capable of reacting with an epoxy group, is generally less than 30% by weight, preferably 2 to 25% by weight, more preferably 5 to 20% by weight, based upon the total amount of the component (A)+component (B).

The addition of the component (A)(ii) can further improve the adhesion property.

The epoxy compound usable as the component (B) in the present invention is a epoxy compound having a molecular weight of not more than 3000 and containing at least two epoxy groups (or oxirane groups) in the molecule.

The epoxy compound must include at least two epoxy groups (or oxirane groups) in the molecule. When only one epoxy group is included in the molecule, there is no substantial effect on the adhesion properties with the substrate intended by the present invention.

The molecular weight of the epoxy compound must be no more than 3000, preferably no more than 1500, and more preferably 200 to 1500. When the molecular weight is more than 3000, a sufficiently high bond strength cannot be obtained when forming the composition.

Specific examples of the epoxy compound are a phthalate diglycidyl ester, isophthalate diglycidyl ester, terephthalate diglycidyl ester, adipate diglycidyl ester, trimethylolpropane polyglycidyl ether, polyglycerol polyglycidyl ether, pentaerythritol polyglycidyl ether, butanediol diglycidyl ether, epoxidized soybean oil, epoxidized linseed oil, epoxidized animal oils, epoxidized liquid rubber, epoxidized silicone resin, hydrogenated bisphenol A diglycidyl ether, phenolnovolak polyglycidyl ether, 4,4'diglycidyloxy-3,3',5,5'-tetramethylbiphenyl, bis(4-glycidylaminophenyl)methane, triglycidyl isocyanurate. Among these, the epoxidized plant (or vegetable) oils are particularly preferred. These are natural vegetable oils whose unsaturated double bonds have been epoxidized using for example a peroxide and are available commercially as, for example, Asahi Denka Kogyo's O-130P (epoxidized soybean oil), O-180A (epoxidized linseed oil), etc.

Note that the oil which has not been epoxidized or has been insufficiently epoxidized, produced as a byproduct when epoxidizing a vegetable oil, does not obstruct the gist and nature of the present invention in any way. Further, the intermixture of a third component derived from the natural oil starting material in the composition does not pose any problem at all.

Here, an epoxidized vegetable oil means a natural vegetable oil whose unsaturated double bonds have been epoxidized using, for example, a peroxide. Epoxidized soybean oil, epoxidized olive oil, epoxidized safflower oil, epoxidized corn oil, epoxidized linseed oil, etc. may be exemplified.

The amount of the component (B) added in the present invention is 0.01 to 5% by weight, based upon the total weight of the component (A) and the component (B), preferably 0.01 to 0.9% by weight. When the amount of the component (B) added is less than 0.01% by weight, there is insufficient improvement of the bond strength with the substrate, while when more than 5% by weight, the bond strength is improved, but the shaped article gives off an odor or other problems occur, which makes this unpreferable.

There has been disclosed art in which the epoxy compound used in the present invention is used as a stabilizer of polymers such as polyvinyl chloride or a plasticizer and, further, is used as a crosslinking agent added to a polymer compound including a carboxylic acid group or carboxylic acid derivative group in its molecule (see, for example, Japanese Unexamined Patent Publication (Kokai) No. 60-112815).

It was never anticipated, however, that these epoxy compounds would give rise to an extremely strong effect of improvement of bonding with a substrate, in particular a substrate composed of polyester, by making them into a resin composition by merely blending with a polyethylene, with no polarity, etc.

The reason for the improvement of the adhesion properties is that the polyolefin is oxidized by the air in the extruder when the polyolefin is being melted and formed or while being in contact with the air when being extruded from the T-die etc. It reacts with the epoxy compound in the process of oxidation, whereby the epoxy compound is first grafted to the polyethylene and then the unreacted epoxy groups remaining in the molecule of the grafted epoxy compound react with the functional groups (e.g., amino groups, carboxyl groups, carbonyl groups, etc.) of the substrate (i.e., member to be bonded).

Epoxidized vegetable oil is particularly effective for a polyester.

Further, it is also possible to add to the composition of the present invention, as desired, the usually used additives, for example, a plasticizer, lubricant, various stabilizers, antiblocking agents, antistatic agents, dyes, pigments, various fillers, etc.

In order to obtain the adhesive resin composition of the present invention, the above components are mixed by, for example, a Henschel mixer, ribbon mixer, etc. or a mixture is further kneaded using an open roll, Banbury mixer, kneader, extruder, etc. These methods may be suitably used. The kneading temperature is preferably 110 to 350° C., more preferably is 120 to 300° C. The composition thus obtained may be used for forming a film, sheet, tube, container, etc. by the known melt formation methods or compression formation methods.

The adhesive resin composition of the present invention is excellent in adhesion properties with a substrate, and therefore, is useful as a laminate.

As the substrate, a film or sheet of a polyamide such as polyamide 6, polyamide 66, polyamide 6-66, and polyamide 12, a polyester such as polyethylene terephthalate and polybutylene terephthalate, or a thermoplastic resin such as saponified ethylene-vinyl acetate copolymer (hereinafter referred to as "EVOH"), a resin film on which silica or aluminum has been vacuum deposited, a metal foil such as of iron or aluminum, paper, and other substances generally used as a film or sheet may be used. The form or shape of the substrate may be any type such as a woven fabric, nonwoven fabric, or sheet.

Among these substrates, the use of a film or sheet of a polyamide or polyester or aluminum foil is preferable. A polyester film or sheet is particularly preferable. These substrates may be treated by corona discharge, flame, preheating, plasma, etc, if desired.

The laminate of the present invention requires that the adhesive resin layer and the substrate come in contact with each other, but there of course may be another layer on the top of the adhesive resin layer or the substrate.

In order to form a laminate from the adhesive resin composition of the present invention and a substrate, extrusion lamination, co-extrusion, heat sensitive adhesion, calendering, etc. may be used. Particularly, extrusion lamination is preferred in that there is a remarkable improvement in the bond strength compared with conventional methods.

When producing the laminate of the present invention by the co-extrusion method, the resin for the co-extrusion may be for example a polyamide, polyester, EVOH, etc., but the invention is not limited to these.

In the extrusion lamination and co-extrusion, the formation is preferably performed at a temperature at which the polyolefin is oxidized. The temperature of formation cannot be limited as it is related with the speed of formation, but in the case of a polyethylene resin is generally at least 120° C., preferably 200 to 400° C., particularly preferably 280 to 340° C. Further, in the case of a polypropylene resin, it is generally at least 170° C., preferably 200 to 350° C., particularly preferably 240 to 320° C.

Since, the speed of formation has an effect on the time of residence in the extruder or the time of contact with air in the molten state, it is related to the oxidation of the polyolefin.

Further, in the case of extrusion lamination, formation is possible at a lower temperature if an ozone or oxygen treatment is performed. An ozone or oxygen treatment as used herein means a method for blowing oxygen gas or ozone gas on the resin emerging from the die to effect the surface of the resin to oxidize. Further, by the heat treating of the laminate produced by extrusion lamination at a temperature of 20 to 160° C., preferably 30 to 80° C., the bond strength can be further improved. This heat treatment may be optionally performed, if desired.

It is possible to obtain a laminate made of an inexpensive polyethylene based adhesive resin composition having good adhesion properties with a substrate composed of a polyamide or polyester, in particular, by the method of extrusion lamination, heat sensitive adhesion, and calendering. Furthermore, the resin composition of the present invention is superior in adhesion properties with, in particular, a polyester, and therefore is useful as a laminate.

EXAMPLES

The present invention will now be further illustrated by, but is by no means limited to, the following Examples.

Examples 1-1 to 1-11 and Comparative Examples 1-1 to 1-7

The values of the physical properties of the Examples 1-1 to 1-11 and the Comparative Examples 1-1 to 1-7 were measured in accordance with the following methods:

(1) High speed formability

This was evaluated by using an extruder of 90 mm$\phi$ (50 rpm), a T-die width of 750 mm, and an air gap of 120 mm, increasing the take-up speed at the temperature of 300° C., and measuring the speed (m/minute) at which the film tears.

(2) Neck-in

This was evaluated by using the above apparatus to form a film of a thickness of 20 $\mu$m at a take-up speed of 200 m/minute, measuring the width of the coat on the substrate, and evaluating the difference with the die width (mm).

(3) Bond strength

A laminate film was obtained by using an extruder of 90 mm$\phi$ (30 rpm) and a T-die width of 750 mm, using as a substrate a bi-axially oriented polyamide 6 film or polyethylene terephthalate film, and laminating at a predetermined temperature and a speed of formation of 200 m/minute.

This laminate film was subjected to a moisture absorption treatment (immersed in water at 30° C. for 24 hours) and sampled. The laminate sample was peeled at the boundary between the polyamide 6 or the polyethylene terephthalate and the laminate coating. The peel strength at a sample width of 15 mm, a peel speed of 300 mm/minute, and 180° peeling was used as the bond strength.

(4) Odor

A film was formed at a predetermined temperature setting the extruder to 90 mm$\phi$ (50 rpm) and the T-die width to 750 mm.

The LD4 described below was formed at 300° C. and used as the standard for comparison of the odor. That is, 100 g of the obtained film was packed and sealed in a glass bottle. This bottle was heated at 60° C. for 4 hours, then gradually cooled to room temperature and then opened and the contents smelled. Using the odor of the LDPE used as the standard for comparison, the odors were evaluated in four ranks:

"⊚" better than the odor of LDPE,

"○" in the case of the same level of odor and posing no practical problem,

"Δ" as a slight sharp odor but posing no practical problem, and

"x" as a noticeably sharp odor posing a practical problem.

The LDPE used as the standard for comparison of the odor was the following LD4.

As the polyolefin serving as the component (A), the following polyethylenes were used:

LD4: LDPE of an MFR of 4.0 g/10 minutes and a density of 0.921 g/cm$^3$

LD19: LDPE of an MFR of 18.7 g/10 minutes and a density of 0.919 g/cm$^3$

LD35: LDPE of an MFR of 35 g/10 minutes and a density of 0.918 g/cm$^3$

As the epoxy-group containing compound serving as the component (B), the following were used:

B-1: Epoxidized soybean oil (O-130P made by Asahi Denka Kogyo K.K.)

B-2: Epoxidized linseed oil (O-180A made by Asahi Denka Kogyo K.K.)

B-3: Phthalate diglycidyl ester

The copolymers used in the comparative examples were as follows:

C-1: Ethylene-glycidyl methacrylate copolymer having a glycidyl methacrylate content of 12% and a number average molecular weight of 10,000 (made by high pressure method)

C-2: Ethylene-methacrylate copolymer having a methacrylic acid content of 8% by weight and an MFR of 8 g/10 minutes (made by Mitsui Dupont Polychemical Co., Newcrel 0908C)

Example 1-1

A composition of 99.5% by weight of LD4 and 0.5% by weight of B-1 was mixed in a Henschel mixer, then was kneaded using a 40 mm single direction bi-axial extruder at 180° C. to produce an adhesive resin composition.

Using the obtained adhesive resin composition and, as a substrate, a polyethylene terephthalate film, a laminate was formed by a 90 mmφ extruder (30 rpm) at a T-die width of 750 mm, a predetermined temperature, and a speed of formation of 200 m/minute to obtain a laminate film.

The results of the evaluation are as shown in Table 1. The composition was excellent in high speed formability, neck-in, bond strength, and odor.

Examples 1-2 to 1-11

Adhesive resin compositions were produced in the same way as with Example 1-1 using the compositions shown in Table 1 to obtain laminate films. The results of the evaluation are as shown in Table 1. Each was excellent in high speed formability, neck-in, bond strength, and odor.

Comparative Example 1-1

A laminate film was obtained in the same way as with Example 1-1 using only LD4. The bond strength was low.

Comparative Examples 1-2 to 1-6

Adhesive resin compositions were produced in the same way as with Example 1 using the compositions shown in Table 1 to obtain laminate films. The results of the evaluation are as shown in Table 1. Either formation was not possible or the high speed formability, neck-in, or odor was poor.

Comparative Example 1-7

An adhesive resin composition was produced in the same way as with Example 1-1 using the composition shown in Table 1 to obtain a laminate film. The results of the evaluation are as shown in Table 1. The bond strength was poor.

TABLE 1

| | Component (A) (wt %) | Component (B) (wt %) | Other components (wt %) | Substrate*1 | Bond strength (g/15 mm) | Odor | Forming temp. (° C.) | High Speed formability (m/min) | Neck-in (mm) | Notes |
|---|---|---|---|---|---|---|---|---|---|---|
| Ex. | | | | | | | | | | |
| 1-1 | LD4 (99.5) | B-1 (0.5) | — | PET film | Inseparable | ○ | 310 | >200 | 44 | |
| 1-2 | LD4 (99.8) | B-2 (0.2) | — | PET film | 900 | ○ | 310 | >200 | 42 | |
| 1-3 | LD4 (99.1) | B-3 (0.9) | — | PET film | 750 | ○ | 310 | >200 | 40 | |
| 1-4 | LD19 (99.5) | B-2 (0.5) | — | PET film | 870 | ⊙ | 290 | >200 | 51 | |
| 1-5 | LD19 (99.95) | B-1 (0.05) | — | PET film | 650 | ○ | 310 | >200 | 54 | |
| 1-6 | LD4 (98) | B-2 (2) | — | PET film | Inseparable | Δ | 310 | >200 | 39 | |
| 1-7 | LD4 (99) | B-1 (1) | — | PA6 film | 510 | ○ | 310 | >200 | 40 | |
| 1-8 | mLL1 (99.4) | B-1 (0.6) | — | PET film | Inseparable | ⊙ | 280 | 180 | 45 | |
| 1-9 | PP (88) | B-2 (2) | LD4 (10) | PET film | Inseparable | ⊙ | 280 | >200 | 55 | |
| 1-10 | LD4 (79) | B-1 (1) | C-2 (20) | PET film | Inseparable | ○ | 300 | 190 | 35 | |
| 1-11 | LD4 (89.5) | B-1 (0.5) | C-3 (10) | PET film | Inseparable | ○ | 310 | >200 | 45 | |
| Comp. Ex. | | | | | | | | | | |
| 1-1 | LD4 (100) | — | — | PET film | 40 | ○ | 310 | >200 | 40 | |
| 1-2 | LD35 (99.5) | B-1 (0.5) | — | PET film | — | — | 310 | — | — | Large surging, unformable |
| 1-3 | LD19 (50) | — | C-2 (50) | PET film | 120 | Δ | 310 | 120 | 70 | |
| 1-4 | LD19 (50) | — | C-1 (50) | PET film | 320 | x | 310 | 100 | 68 | Bite defects at extruder |
| 1-5 | LD19 (90) | — | C-1 (10) | PET film | 160 | x | 290 | 50 | 66 | |
| 1-6 | LD4 (94) | B-1 (6) | — | PET film | Inseparable | x | 310 | — | — | |
| 1-7 | LD4 (99.995) | B-1 (0.005) | — | PET film | 70 | ○ | 310 | >200 | 44 | |

*1PET = polyethylene terephthalate PA6 = polyamide 6 (i.e., Nylon 6)

Examples 2-1 to 2-13 and Comparative Examples 2-1 to 2-12

The MFR was measured based on JIS K6758 under conditions of a temperature of 190° C. for a polyethylene resin and a temperature of 230° C. for a polypropylene resin. The bond strength was found by measuring the strength (g) when a 15 mm width test specimen was allowed to stand in a constant temperature tank of a temperature of 23° C. and a relative humidity of 50% for 24 hours, then was peeled apart at an angle of 180° at a speed of 300 mm/minutes. Further, the moist strength was determined by measuring the bond strength by the above method after allowing the specimen to stand in a constant temperature tank of a temperature of 60° C. and a relative humidity of 90% for 48 hours.

The yarn withdrawal resistance was determined by cutting two warps at a center portion 70 mm from a short side of the test specimen (20 mm×170 mm) and cutting from the two long sides at a location 30 mm from that position to the other short side to leave the two warps of the center portion and cut off the other warps. The test specimen was attached to a tensile tester and examined at a tensile speed of 200 mm/minute.

The creep peel test of the bond area was performed by superposing two short test specimens of 30 mm width with a 50 mm overlap in the longitudinal direction and heat bonding the overlapped portion using a welder in a strip of a width of 20 mm. The bonded films were subjected to a load of 40 kg and allowed to stand in that state at a temperature of 40° C. for 24 hours after which existence of breakage was determined.

Further, as the component (A) (ii), the following six types (A-1 to A-6) of resins were used:

A-1: ethylene-maleic anhydride copolymer (content of maleic anhydride: 2.5 wt %, MFR: 12 g/10 minutes)
A-2: ethylene-maleic anhydride-acrylate terpolymer (MFR: 10 g/10 minutes, melting point: 83° C.)
A-3: ethylene-maleic anhydride-acrylate terpolymer (MFR: 12 g/10 minutes, melting point: 70° C.)
A-4: ethylene-methacrylic acid (Newcrel 0908C: made by Mitsui Dupont Chemical Co.)
A-5: ionomer (Himylan H1605; made by Mitsui Dupont Chemical Co.)
A-6: maleic anhydride grafted polypropylene (Adtex ER320P; made by Showa Denko)

As the component (B), the following three types (B-1 to B-3) were used:
B-1: epoxidized soybean oil (O-130P; made by Asahi Denka Kogyo)
B-2: epoxidized linseed oil (O-180A; made by Asahi Denka Kogyo)
B-3: epoxy resin material (Epicoat 1001×70; made by Yuka Shell Epoxy Co.)

As the component (A) (i), the following two types (C-1 to C-2) were used:

Examples 2-1 to 2-11 and Comparative Examples 2-1 to 2-10

The components (A), (B), and (A) (i) of the types and amounts shown in Table 2 were dry-blended by a Henschel mixer, then the blends were pellatized using an extruder (made by Kobe Steel Corporation; KTX-30). The MFRs of the resultant pellets were measured.

The pellets were laminated on substrates (polyester film and polyamide film) to thicknesses of 25 $\mu$m using a 90 mm$\phi$, extrusion laminator (made by Modern Machinery Co.) at a resin temperature of 300° C. and a speed of lamination of 200 mm/minute. For reinforcement in the peeling test, an LLDPE film of a thickness of 60 $\mu$m was sandwich laminated. The resultant films were measured as to the bond strength at the interfaces between the resin compositions of the present invention and the substrates. The results are shown in Table 2.

TABLE 2

| | Component (A) | | Component (B) | | Component case: 1 | | | Bond strength (g/15 mm) | | | |
| | | | | | | | | Polyester substrate | | Polyamide substrate | |
| | Type | Proportion (parts by weight) | Type | Proportion (parts by weight) | Type | Proportion (parts by weight) | MFR | After lamination | After moistening | After lamination | After moistening |
|---|---|---|---|---|---|---|---|---|---|---|---|
| Ex. 2-1 | A-1 | 100 | B-1 | 1.0 | — | — | 12.0 | 800 | 810 | 910 | 910 |
| Ex. 2-2 | A-1 | 100 | B-2 | 1.0 | — | — | 11.5 | 800 | 800 | 850 | 840 |
| Ex. 2-3 | A-1 | 100 | B-3 | 1.0 | — | — | 11.0 | 750 | 700 | 870 | 840 |
| Ex. 2-4 | A-2 | 100 | B-2 | 1.0 | — | — | 10.0 | 970 | 950 | 740 | 740 |
| Ex. 2-5 | A-1 | 70 | B-1 | 0.5 | — | — | 11.8 | 790 | 810 | 810 | 800 |
| | A-3 | 30 | B-2 | 0.5 | | | | | | | |
| Ex. 2-6 | A-1 | 40 | B-1 | 0.5 | C-1 | 60 | 8.0 | 840 | 860 | 870 | 870 |
| | | | B-2 | 0.5 | | | | | | | |
| Ex. 2-7 | A-4 | 100 | B-1 | 0.05 | — | — | 7.5 | 670 | 670 | 450 | 640 |
| Ex. 2-8 | A-1 | 40 | B-1 | 1.0 | C-1 | 60 | 8.6 | 850 | 860 | 780 | 790 |
| Ex. 2-9 | A-2 | 40 | B-3 | 0.5 | C-1 | 60 | 8.8 | 810 | 810 | 780 | 760 |
| Ex. 2-10 | A-5 | 100 | B-2 | 1.0 | — | — | 4.0 | 700 | 710 | 540 | 590 |
| Ex. 2-11 | A-5 | 1 | B-2 | 1.0 | C-2 | 65 | 10.5 | 750 | 780 | 780 | 780 |
| | A-6 | 34 | | | | | | | | | |
| Comp. Ex. 2-1 | A-1 | 100 | — | — | — | — | 12.5 | 380 | 100 | 650 | 680 |
| Comp. Ex. 2-2 | A-2 | 100 | — | — | — | — | 11.8 | 370 | 120 | 730 | 720 |
| Comp. Ex. 2-3 | A-1 | 70 | — | — | — | — | 12.3 | 410 | 150 | 780 | 770 |
| | A-3 | 30 | — | — | | | | | | | |
| Comp. Ex. 2-4 | A-1 | 40 | — | — | C-1 | 60 | 9.1 | 210 | 90 | 650 | 670 |
| Comp. Ex. 2-5 | A-4 | 100 | — | — | — | — | 8.0 | 200 | 0 | 150 | 600 |
| Comp. Ex. 2-6 | A-1 | 35 | — | — | C-1 | 60 | 9.4 | 300 | 90 | 730 | 700 |
| | A-4 | 5 | | | | | | | | | |
| Comp. Ex. 2-7 | A-2 | 40 | — | — | C-1 | 60 | 9.3 | 200 | 110 | 740 | 750 |
| Comp. Ex. 2-8 | A-5 | 100 | — | — | — | — | 5.0 | 190 | 0 | 170 | 500 |
| Comp. Ex. 2-9 | A-5 | 1 | — | — | C-2 | 65 | 12.1 | 250 | 100 | 740 | 730 |
| | A-6 | 34 | | | | | | | | | |
| Comp. Ex. 2-10 | A-1 | 30 | B-1 | 20 | C-1 | 70 | 8.0 | 220 | 150 | 100 | 80 |

C-1: low density polyethylene (Showrex L182; made by Showa Denko), MFR: 8 g/10 minutes, density: 0.918 g/cm$^3$
C-2: polypropylene (Shoallomer LR510; made by Showa Denko), MFR: 14 g/10 minutes Further, as the substrate, a polyester film (12 $\mu$m), polyester base cloth (yarn denier: 750 d, count: 20×23/inch$^2$), and polyamide 66 film (15 $\mu$m) were used. As the heat sensitive adhesion substrate, a polyester coated color steel sheet (Yodocolor F1041, made by Yodagawa Steel Works Ltd.) was used.

Example 2-12

A polyester base cloth was used as the substrate. A composition comprised of 100 parts by weight of the component (A) (A-3) and 1.0 part by weight of the component (B) (B-1) was laminated on the two sides of the base cloth to thicknesses of 250 $\mu$m by the extrusion lamination method. The yarn withdrawal resistance and the strength in the creep peel test of the bonded area were measured. The results are shown in Table 3.

Comparative Example 2-11

The same procedure was followed as in Example 2-12 to obtain and evaluate a laminate except that just the component (A) (A-3) was used. The results are shown in Table 3.

TABLE 3

| | Composition | | Yarn withdrawal resistance (kgf/2 yn) | | Creep peel test of |
|---|---|---|---|---|---|
| | A-3 | B-1 | T-direction | M-direction | bonded area |
| Ex. 2–12 | 100 | 1.0 | 35 | 40 | No breakage (95% holding rate) |
| Comp. Ex. 2–11 | 100 | — | 6 | 9 | Breaks |

Example 2-13, Comparative Example 2-12

The compositions used in Example 2-12 and Comparative Example 2-11 were used to prepare films of thicknesses of 75 μm using a T-die molding machine. The films were sandwiched between a color plate (25 mm×125 mm, thickness 0.6 mm) and a rockwell of a thickness of 5 mm (Roofnen L; made by Nittobo Kenkosha), then were placed in a heat sensitive press while covered with spacers (thickness 3.5 mm) to prevent crushing, were heated at just the steel plate side at a temperature of 140° C., and were pressed at a sample facial pressure of 1 kg/cm² for 3 seconds to obtain laminates. The laminates were separated by hand to evaluate the state of peeling under three conditions: initially, after immersion in 60° C. warm water for 1 hour, and after immersion in 60° C. warm water for 4 hours.

The result of the evaluation was that the laminate made using the composition of Example 2-12 completely ruptured.

On the other hand, the laminate obtained using the composition of comparative example 2-11 completely ruptured at the initial stage, but suffered from interface rupture after immersion in 60° C. warm water for 1 hour and exhibited separation over the entire surface of the bonded area after immersion in 60° C. warm water for 4 hours.

What is claimed is:

1. An adhesive resin composition for extrusion lamination to a substrate having a functional group capable of reacting with an epoxy group consisting essentially of:
   (A) at least one polyolefin having a melt flow rate of 0.1 to 30 g/10 min and selected from the group consisting of (a) ethylene homopolymers, (b) propylene polymers, and (c) a mixture thereof, and
   (B) an epoxy compound capable of grafting to the polyolefin (A) and the substrate during the extrusion lamination and having at least two epoxy groups in the molecule and having a number average molecular weight of 3000 or less, the ratio of the weight of component (B) to the total weight of the components (A) and (B) being 0.01 to 0.9%, wherein said epoxy compound is:
   (i) phthalate diglycidyl ester,
   (ii) isophthalate diglycidyl ester,
   (iii) terephthalate diglycidyl ester,
   (iv) adipate diglycidyl ester,
   (v) trimethylolpropane polyglycidyl ether,
   (vi) polyglycerol polyglycidyl ether,
   (vii) pentaerythritol polyglycidyl ether,
   (viii) butanediol diglycidyl ether,
   (ix) epoxidized plant oil,
   (x) epoxidized animal oils,
   (xi) epoxidized liquid rubber,
   (xii) epoxidized silicone resin,
   (xiii) hydrogenated bisphenol A diglycidyl ether,
   (xiv) phenolnovolak polyglycidyl ether,
   (xv) 4,4'-diglycidyloxy-3,3',5,5'-tetramethylbiphenyl,
   (xvi) bis(4-glycidylaminophenyl)methane or
   (xvii) triglycidyl isocyanurate,
   and, optionally, (C) one or more additives selected from the group consisting of a plasticizer, a lubricant, a stabilizer, an antiblocking agent, an antistatic agent, a dye, a pigment other than a dye and a filler other than a pigments,
   wherein the composition is extrusion laminated by the oxidation of the polyolefin, the grafting of the epoxy compound with the polyolefin, and the reaction of the unreacted epoxy groups of the grafted epoxy compound with the functional groups of the substrate.

2. An adhesive resin composition for extrusion lamination as claimed in claim 1, wherein the polyolefin (A) is a branched low density polyethylene.

3. An adhesive resin composition for extrusion lamination as claimed in claim 1, wherein the epoxy compound is an epoxidized plant oil.

4. An adhesive resin composition for extrusion lamination to a substrate having a functional group capable of reacting with an epoxy group consisting essentially of:
   (A) at least one polyolefin having a melt flow rate of 0.1 to 30 g/10 min and selected from the group consisting of (a) ethylene homopolymers, (b) propylene polymers, and (c) a mixture thereof, and
   (B) an epoxy compound capable of grafting to the polyolefin (A) and the substrate during the extrusion lamination and having at least two epoxy groups in the molecule and having a number average molecular weight of 3000 or less, the ratio of the weight of component (B) to the total weight of the components (A) and (B) being 0.01 to 0.9%,
   wherein the composition is extrusion laminated by the oxidation of the polyolefin, the grafting of the epoxy compound with the polyolefin, and the reaction of the unreacted epoxy groups of the grafted epoxy compound with the functional groups of the substrate.

5. The adhesive resin composition of claim 4 wherein the epoxy compound has a number average molecular weight of 1500 or less.

6. The adhesive resin composition of claim 4 wherein the epoxy compound has a number average molecular weight of from 200 to 1500.

7. The adhesive resin composition of claim 4 wherein the epoxy compound is phthalate diglycidyl ester, isophthalate diglycidyl ester, terephthalate diglycidyl ester, adipate diglycidyl ester, trimethylolpropane polyglycidyl ether, polyglycerol polyglycidyl ether, pentaerythritol polyglycidyl ether, butanediol diglycidyl ether, epoxidized plant oil, epoxidized animal oil, epoxidized liquid rubber, epoxidized silicone resin, hydrogenated bisphenol A diglycidyl ether, phenolnovolak polyglycidyl ether, 4,4'-diglycidyloxy-3,3',5,5'-tetramethylbiphenyl, bis(4-glycidylaminophenyl)methane, or triglycidyl isocyanurate.

8. The adhesive resin composition of claim 1, wherein the epoxidized plant oil is epoxidized soybean oil or epoxidized linseed oil.

9. The adhesive resin composition of claim 7, wherein the epoxidized plant oil is epoxidized soybean oil or epoxidized linseed oil.

* * * * *